No. 856,412. PATENTED JUNE 11, 1907.
A. J. MARTIN.
ELECTRIC METER.
APPLICATION FILED NOV. 2, 1906.
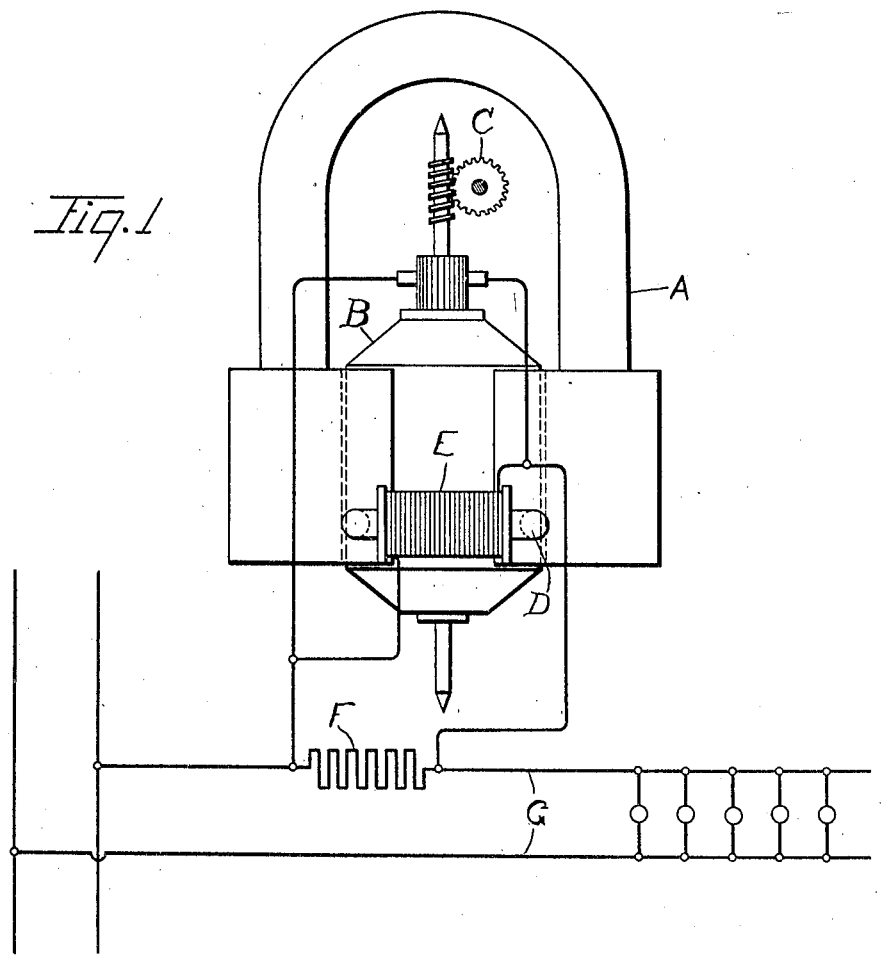
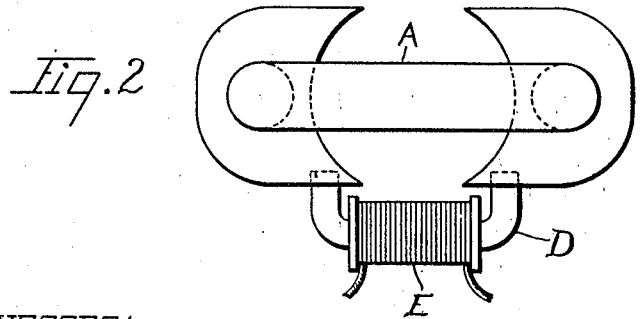
WITNESSES:
Lester H. Fulmer
J. Ellis Glen
INVENTOR
ARTHUR J. MARTIN.
BY
ATT'Y.

UNITED STATES PATENT OFFICE.

ARTHUR J. MARTIN, OF RUGBY, ENGLAND, ASSIGNOR TO GENERAL ELECTRIC COMPANY, A CORPORATION OF NEW YORK.

ELECTRIC METER.

No. 856,412.  Specification of Letters Patent.  Patented June 11, 1907.

Application filed November 2, 1906. Serial No. 341,777.

*To all whom it may concern:*

Be it known that I, ARTHUR J. MARTIN, a subject of the King of Great Britain and Ireland, residing at Rugby, Warwickshire, England, have invented certain new and useful Improvements in Electric Meters, of which the following is a specification.

My invention relates to electric meters of the type described in Patent No. 641,140, issued to C. E. O'Keenan, January 19, 1900, comprising a field of constant strength and an armature on the terminals of which is impressed a voltage proportional to the load-current. The accuracy of registration of a meter of this type depends upon the counter-electromotive force of the armature, and consequently the speed, remaining exactly proportional to the impressed voltage and to the load-current. Over the greater part of its range this proportionality is maintained, so that on full load the registration of the meter is accurate, but on light loads, owing to the greater proportional effect of friction and other losses the speed of the meter falls below its proper value.

The object of my invention is to improve the accuracy of such meters on light loads, and broadly consists in providing means for producing a weakening of the field-strength on light loads. This weakening of field-strength decreases the counter-electromotive force per revolution, and consequently increases the speed of the meter.

More specifically stated, my invention consists in providing an auxiliary yoke for the field magnet with a magnetizing winding supplied with current proportional to the load-current. This yoke is arranged to be saturated at a fraction of full load, and the magnetizing coil is so connected that the magnetism of the auxiliary yoke assists the magnetism of the main yoke. Since over the greater part of the range of the meter the auxiliary yoke is saturated, the field-strength of the meter remains practically constant, just as though the auxiliary yoke were not present; but when the load falls below a certain limit, the magnetism of the auxiliary yoke falls below the point of saturation and a decrease of load below this point results in a weakening of the field-strength of the meter. The speed of the meter is consequently increased, and its accuracy on light loads improved.

My invention will best be understood by reference to the accompanying drawing, in which Figure 1 shows an elevation of a meter arranged in accordance with my invention; and Fig. 2 shows a plan view of the same.

In the drawings, A represents the field-magnet of the meter, which comprises a pair of field-poles and a yoke of constant magnetic strength. This yoke may be either a permanent magnet or may be magnetized from any suitable constant-current source.

B represents the meter armature, which is rotatably mounted between the field-poles and which drives the registering train indicated by the gear C.

D represents an auxiliary yoke, which is connected to the field-poles in parallel with the main yoke, and which carries a magnetizing coil E, which may be connected in parallel with the meter armature.

The terminals of the armature circuit are connected across a resistance F, which is placed in series with the conductors G forming the circuit which is to be metered.

The operation of the meter is as follows: Since the armature is connected in shunt to the resistance F, it has impressed on its terminals a voltage proportional to the ohmic drop in the resistance, and consequently to the load-current in the circuit G. Therefore, with a constant field-strength, the armature will tend to rotate at a speed proportional to the load-current, in order to produce a counter-electromotive force approximately equal to the voltage impressed on the armature. Over the greater part of its range the proportionality of armature speed to load-current remains practically constant with a uniform field-strength, but on light loads, if the field-strength were maintained constant, the armature-speed would fall below its proportional value.

The magnetizing winding E which carries a current proportional to the load-current, acts to weaken the field winding on light loads in the following way: The core D is arranged to be saturated at a fraction of full load, so that over the greater part of the range of the meter the coil E does not effect the constancy of magnetization of the field-magnet. When the load falls below a certain point, the magnetization of the auxiliary yoke D falls below the saturation point, and since the coil E is arranged to assist the magnetization of the main yoke, a further decrease of the load-current results in weakening the effective field-strength of the meter. The speed of the meter on light loads is consequently increased and the accuracy of the meter improved.

I do not desire to limit myself to the particular construction and arrangement of parts here shown, but aim in the appended claims to cover all modifications which are within the scope of my invention.

What I claim as new and desire to secure by Letters Patent of the United States, is,—

1. An electric meter comprising a field of substantially constant strength on full load, a rotatable armature, connections for supplying to said armature a voltage proportional to the load-current, a registering train driven by said armature, and means for producing a decrease in the strength of said field on light load.

2. An electric meter comprising field-poles, a main yoke of constant magnetization joining said poles, an armature rotatably mounted between said poles, connections for supplying to said armature a voltage proportional to the load-current, a registering train driven by said armature, an auxiliary yoke joining said field-poles, and means for applying to said auxiliary yoke a magneto-motive force proportional to the load-current, said yoke being arranged to be saturated at a fraction of full load.

3. An electric meter comprising field-poles, a main yoke of constant magnetization joining said poles, an armature rotatably mounted between said poles, a registering train driven by said armature, an auxiliary yoke joining said field-poles, a magnetizing winding for said auxiliary yoke, and connections for supplying both to the armature and to said magnetizing winding voltage proportional to the load-current, said yoke being arranged to be saturated at a fraction of full load.

4. In combination with an electric circuit and a resistance in series therewith, a meter for said circuit comprising a field magnet of substantially constant strength on full load, a rotatable armature connected in shunt to said resistance, a registering train driven by said armature, and means for producing a decrease in strength of said field magnet on light load.

5. In combination with an electric circuit and a resistance in series therewith, a meter for said circuit comprising field-poles, a main yoke of constant magnetization joining said poles, an armature rotatably mounted between said poles and connected in shunt to said resistance, a registering train driven by said armature, an auxiliary yoke joining said field-poles, and a magnetizing winding for said auxiliary yoke connected in circuit with the armature, said auxiliary yoke being arranged to be saturated at a fraction of full load.

6. An electric meter comprising a field magnet of substantially constant strength, a rotatable armature, connections for supplying to said armature a voltage proportional to the load-current, a registering train driven by said armature, a field winding supplied with current proportional to the load-current, and a magnetic circuit for said field winding acting upon said armature and arranged to be saturated at a fraction of full load.

In witness whereof, I have hereunto set my hand this fifteenth day of October, 1906.

A. J. MARTIN.

Witnesses:
CHARLES W. FULLER,
J. W. FOSTER.